United States Patent [19]
Koller

[11] Patent Number: 5,275,728
[45] Date of Patent: Jan. 4, 1994

[54] DEVICE TO SEPARATE SOLID MATTER FROM A STREAM OF LIQUID

[76] Inventor: Josef Koller, Ziegeleiweg 26, 4000 Erkrath, Fed. Rep. of Germany

[21] Appl. No.: 831,277

[22] Filed: Feb. 6, 1992

[30] Foreign Application Priority Data

Feb. 6, 1991 [DE] Fed. Rep. of Germany ....... 4103514

[51] Int. Cl.$^5$ .................. B01D 29/37; B01D 29/68
[52] U.S. Cl. .................... 210/391; 210/393; 210/333.1; 210/413; 210/415; 210/408; 210/448; 210/497.3
[58] Field of Search ............... 210/413, 414, 415, 408, 210/448, 497.3, 131, 108, 333.1, 373, 374, 393, 396, 397

[56] References Cited

U.S. PATENT DOCUMENTS

| | | | |
|---|---|---|---|
| 1,993,214 | 3/1935 | Hass | 210/408 |
| 2,066,479 | 1/1937 | MacIsaac | 210/777 |
| 4,347,134 | 8/1982 | Suehaug | 210/414 |
| 4,582,603 | 4/1986 | Nasse | 210/413 |
| 4,610,786 | 9/1986 | Pearson | 210/333.1 |
| 4,849,105 | 7/1989 | Borchert | |
| 4,867,879 | 9/1989 | Müller | 210/411 |
| 4,904,397 | 2/1990 | Elmer | 210/415 |
| 5,152,891 | 10/1992 | Netkowicz | 210/415 |

FOREIGN PATENT DOCUMENTS

| | | |
|---|---|---|
| 0225401 | 12/1985 | European Pat. Off. . |
| 3640638 | 11/1986 | Fed. Rep. of Germany . |
| 3829360 | 3/1990 | Fed. Rep. of Germany . |

*Primary Examiner*—Thomas M. Lithsow
*Attorney, Agent, or Firm*—Andrus, Sceales, Starke & Sawall

[57] ABSTRACT

The invention pertains to a device to separate solid materials from a stream of liquid, particularly from cooling water. In the case of the known devices, difficulties occur in cleaning the filter from fibrous contaminants generally or starting with a certain size. The subject device draws off fibrous as well as coarse grained contaminants equally well.

A preferably funnel shaped filter 3 with a suction device 4 running at an angle to the surface line 6 of the funnel filter 3 is arranged in a pipe shaped housing. The inclination creates a force component 19 which transports the coarse grained contaminants to the tip of the filter where they are drawn off by the suction opening 8 of the suction rotor 7. The fibrous contaminants are drawn off by the suction device 4.

9 Claims, 5 Drawing Sheets

DEVICE TO SEPARATE SOLID MATTER FROM A STREAM OF LIQUID

BACKGROUND OF THE INVENTION

The invention pertains to a device for the separation of solid materials from a stream of liquid, consisting of a pipe shaped housing at the interior wall of which there is a preferably funnel shaped filter which with its tip points in the direction of the flow, and at the upstream side a rotating suction device running at an angle to the surface line of the filter and an axially mounted suction rotor at the end of which, in the direction of the flow, provisions are made for a suction opening.

From European Patent 0225 401 a filter is known which features a funnel shaped screen and a hydraulic rinsing device. The filter has proven successful in the case of coarse grained contaminants, but it has the disadvantage that fibrous contaminants are often pressed, due to the spray jets, against the filter surface at the discharge side and that they do not separate from the filter surface.

In German Patent 36 40 638 a filter is known in the case of which the filter is subdivided into individual sectors. Coarse grained contaminants can be drawn off without any problems. For economical reasons, the quantity to be drawn off cannot be increased arbitrarily, so that, especially in the case of larger filters due to the large sectors, the suction velocity in the filter perforation is often insufficient to remove fibrous contaminants from the filter surface and to carry them off.

The filter of published German patent application 38 29360 is well suited for fibrous contaminants, but in the case of coarse grained contaminants it can happen that these get caught between the filter and the rotating suction device block the latter.

SUMMARY OF THE INVENTION

The purpose of the invention described herein is to create a device which assures an equally efficient cleaning of the filter surface in the case of coarse grained as well as fibrous contaminants.

To solve this task, it is intended to install a rotationally symmetric filter, in the preferred version funnel shaped, in a pipe shaped housing, and on the discharge side a suction device, arranged at an angle to the surface line of the filter, to draw off predominantly fibrous contaminants, and that the suction device is preferably rotating. In addition, a suction rotor is arranged axially, which, at its end, has a suction opening to draw off coarse grained contaminants. The suction device features elastic sealing lips.

In the case of suction devices with funnel or cylindrical shaped filters known so far, the suction device was arranged alongside the surface line of the filter, so that the suction device formed a straight line of the filter. The consequence was that when the suction device was rotated, coarse grained pollutants (e.g. stones, pieces of wood, shells, etc.) which, due to their size, could no longer reach the suction device, were pushed ahead on the filter. As the pushing force is created by a surface of the suction device arranged at a 90° angle to the rotational direction, the coarse grained contaminants remain in a circular path and are not transported in a certain direction and removed. This often led to jamming between the filter and the suction device and, therefore, also to a blockage of the rotating suction device.

In the case of the device of the present invention, the suction device is arranged as already mentioned at an angle to the surface line of the filter, in order to prevent jamming and blocking. If the pushing force, created by the obliquely arranged suction device, is analyzed by parallelogram, one receives a force component which transports the coarse grained contaminants in the direction of the flow.

The necessary pushing force in the direction of flow is created by screw, helix or spiral shaped suction devices or a combination thereof. For economic reasons, the suction device is divided into several sections.

The device of the present invention draws off fibrous or coarse grained contaminants equally well. As an option, the filter tip can be designed as a bypass flap axially extendable in the direction of the flow.

DETAILED DESCRIPTION OF THE PREFERRED EMBODIMENT

Figure 1:
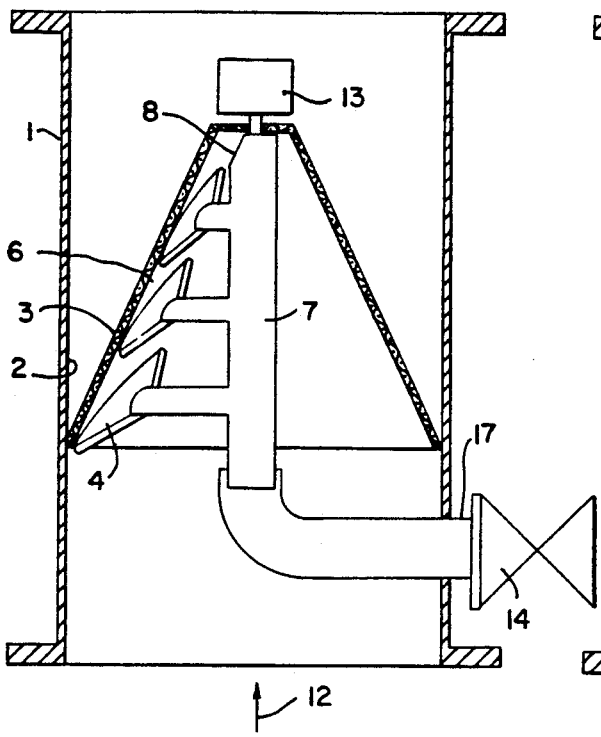
FIG. 1 is a longitudinal cross-section of the device of the present invention with a funnel filter, suction device, and suction pipe.
Figure 2:
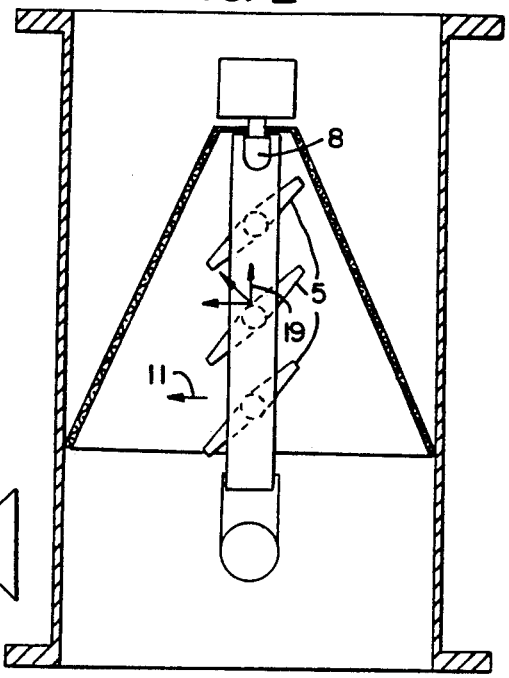
FIG. 2 is a longitudinal cross-section through FIG. 1.

FIGS. 1 and 2 show the device of the present invention with a cone shaped filter 3 in the pipe shaped housing 1. The flow arrow 12 indicates the direction of the flow. In order to clean (backflush) the filter 3, the closure valve 14 is opened. By doing so, the pressure in the contaminant drain pipe 17 and therefore, also in the suction rotor 7, is lower than in the housing 1. In the area of the suction slot 18 (FIG. 4), the direction of the flow 12 is reversed, and the contaminants adhering to the filter 3 are drawn off. The cleaning of the entire filter surface 3 is achieved by rotating the suction device 4 and the suction pipe 7 by means of the drive 13. Coarse grained contaminants are transported by the force component 19 in the direction of the tip of the filter and will be drawn off there by the suction opening 8 of the suction pipe 7.

Figure 3:
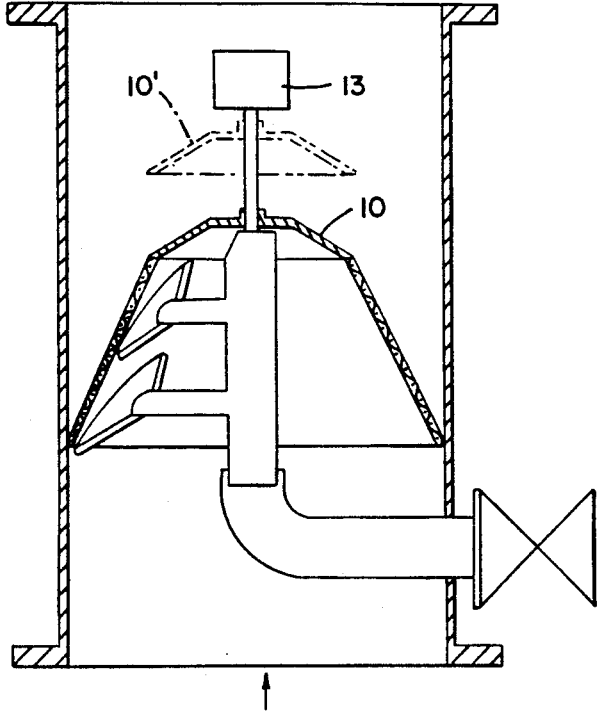
FIG. 3 is a longitudinal cross-section through a modified device with bypass flap.

FIG. 3 shows the device with bypass flap 10, which protects the filter 3 from overloads and, therefore, from mechanical damage. The bypass flap 10 is held closed by springs, shear pins, etc. In the case of very heavy contaminant loads (high differential pressure), the by pass flap 10 moves axially in the direction of the flow 12 and thus reduces the high differential pressure at the filter, until the latter is cleaned. Thus, the filter 3 is protected from overloads.

Figure 4:
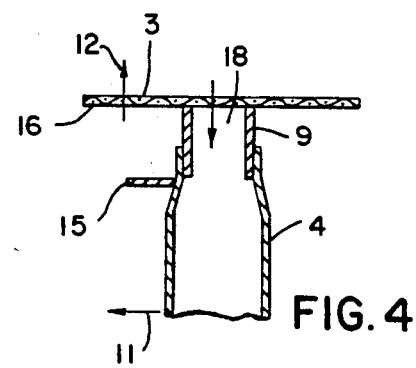
FIG. 4 is a partial section through the suction device with elastic sealing lips and turbulence plate.

FIG. 4 shows the suction device 4 with the suction slot 18 and the elastic sealing lips 9. The turbulences created by the turbulence plate 15 facilitate the transporting of coarse grained contaminants in the direction of the filter tip and the drawing off of fibrous contaminants.

Figure 4A:
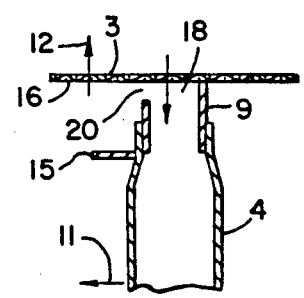
FIG. 4A is a modified construction of the elastic sealing lips shown in FIG. 4.

The sealing lip 9 shown in FIG. 4A forms a gap 20 with respect to screen 16. However, the gap is provided only for the lip 9 on the leading side with respect to direction of rotational movement, as shown by arrow 11.

Figure 5A:
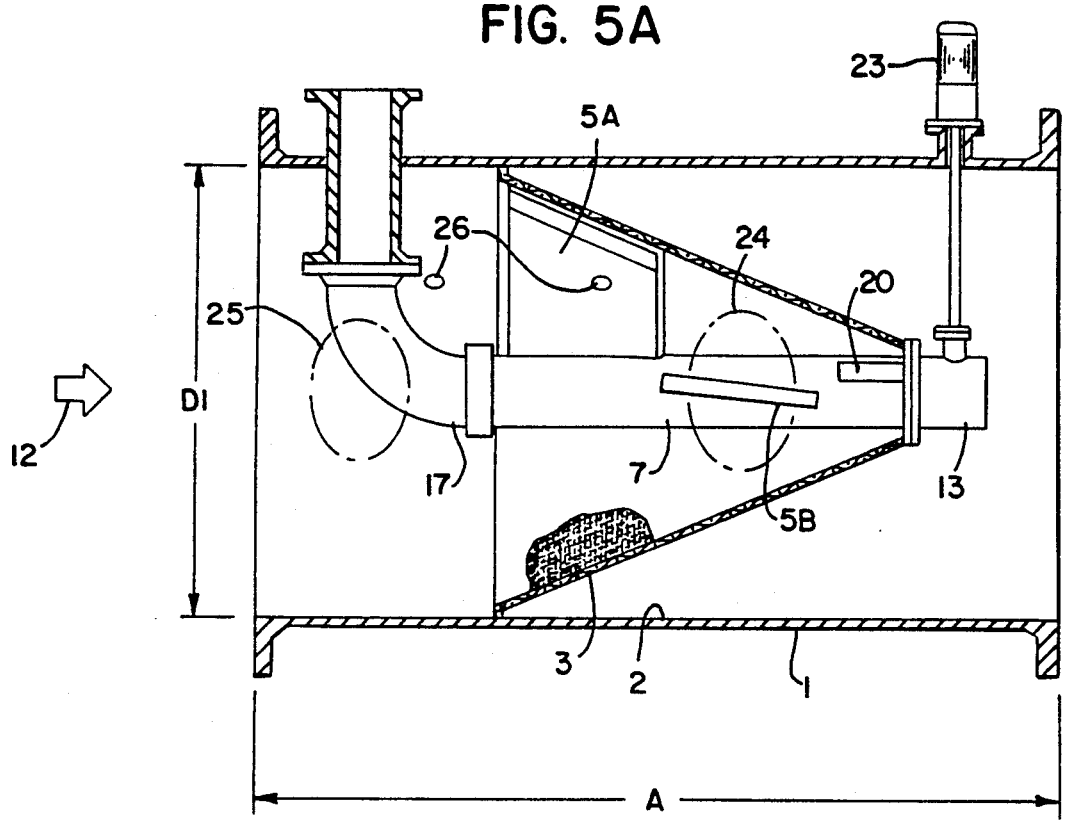
FIGS. 5A, 6A, 7A and 8A each show a view similar to the FIG. 1 embodiment.
Figure 5B:
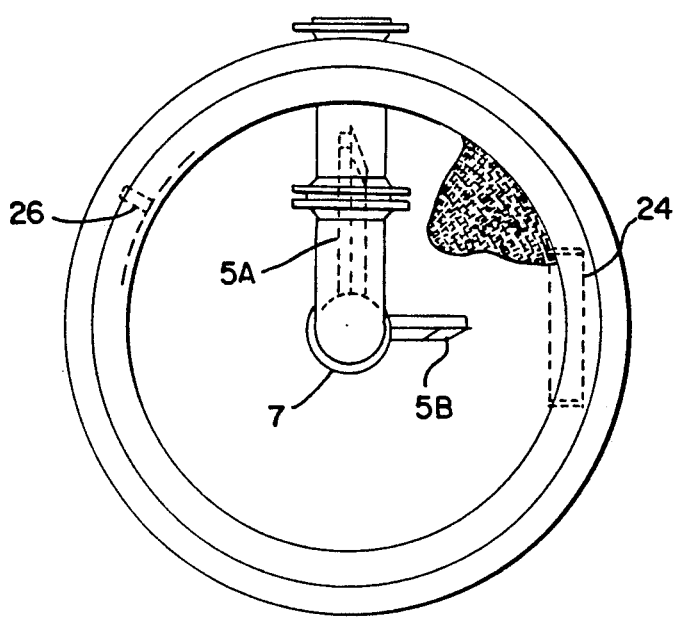
FIGS. 5B, 6B, 7B and 8B each show a view from the left of the corresponding FIGS. 5A-8A viewed in the flow direction.

Referring especially to FIGS. 5A and 5B, a cylindrical housing 1 of length A is connectable by flanges on each end to pipes of diameter D1 (e.g. more than 800 millimeters). The housing 1 contains a funnel screen 3 having for example perforation holes of 3 to 12 mm in diameter, the outer end of the funnel screen being fixedly connected to the inner surface 2 of housing 1. The suction devices 5A and 5B of the cleaning means are mounted onto suction pipe 7 and rotatable therewith to draw off debris from the screen. Note that the suction devices are somewhat tilted with respect to the axis of the tube 7, which tube has bearings at the end of debris output tube 17 on one end and drive means 13 on the other end, the drive means 13 being connected with motor 23 outside of the housing 1. As may be seen from FIG. 5B, the two suction devices are mounted at an angle to one another, which angle is shown to be 90° (being the least expensive construction), but may also be any other angle. The number of suction devices may vary, e.g. from 1 to 5, depending on the diameter of tube 7.

Furthermore, there may optionally be inspection holes (24 and 25) of sufficient size for inspection and repairing purposes, such holes being closed during normal operation. For debris control, there are two connections 26 of e.g. 0.5 inch diameter. Back wash pipe 17 leads out of the housing 1 and has flange connection of usual size.

Figure 6A:
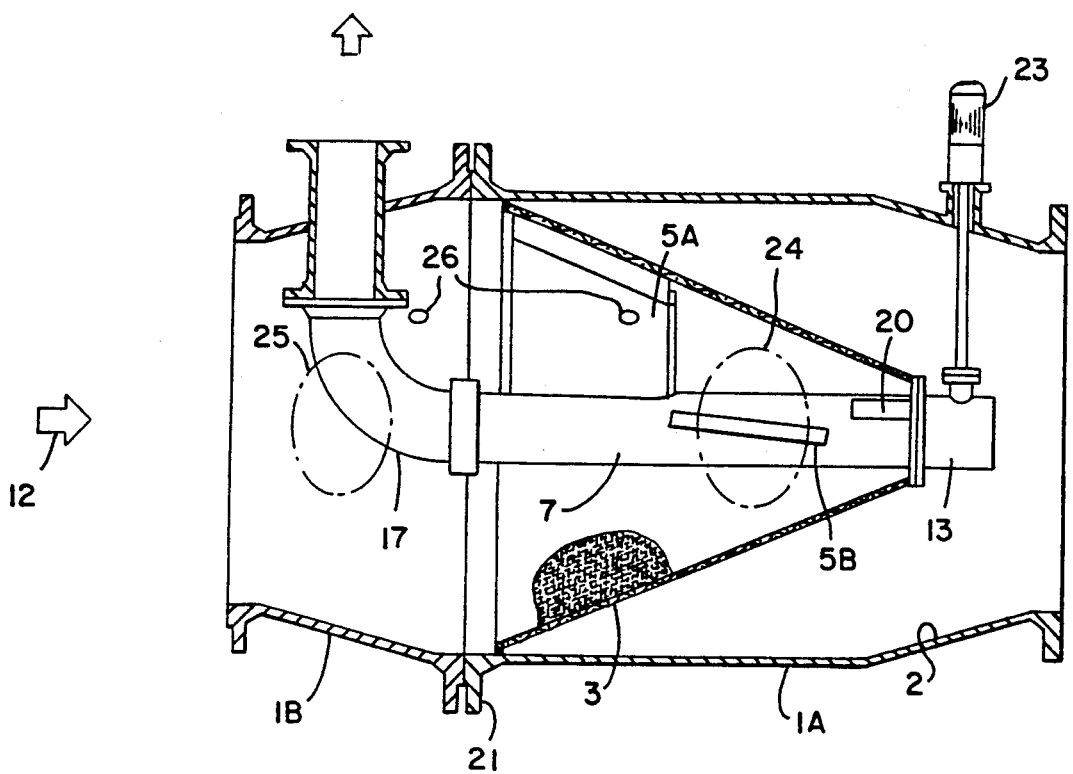
Figure 6B:
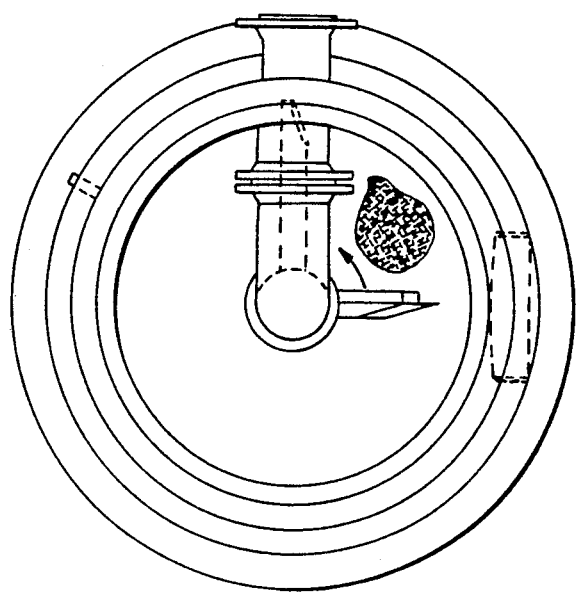

FIGS. 6A and 6B are similar to the embodiment of FIGS. 5A and 5B, however, more useful for connection to tubes having diameters of less than a specific diameter (800 mm being an example), whereby the housing has in its middle part which contains the screen 3 a greater diameter than the two end parts forming the flanges to be connected with the tubes containing the fluid to be screened (from the left) and having been screened (to the right), not shown. For practical reasons (to be able to mount the screen 3), the housing comprises two parts 1A and 1B connected by flange connection 21. Suction devices 5 are formed by tubes of rectangular cross section, as opposed to the FIG. 2 construction, where a circular cross section is used and where the three suction sections are all in one line, although tilted, with respect to the axis of the rotor tube 7.

Figure 7A:
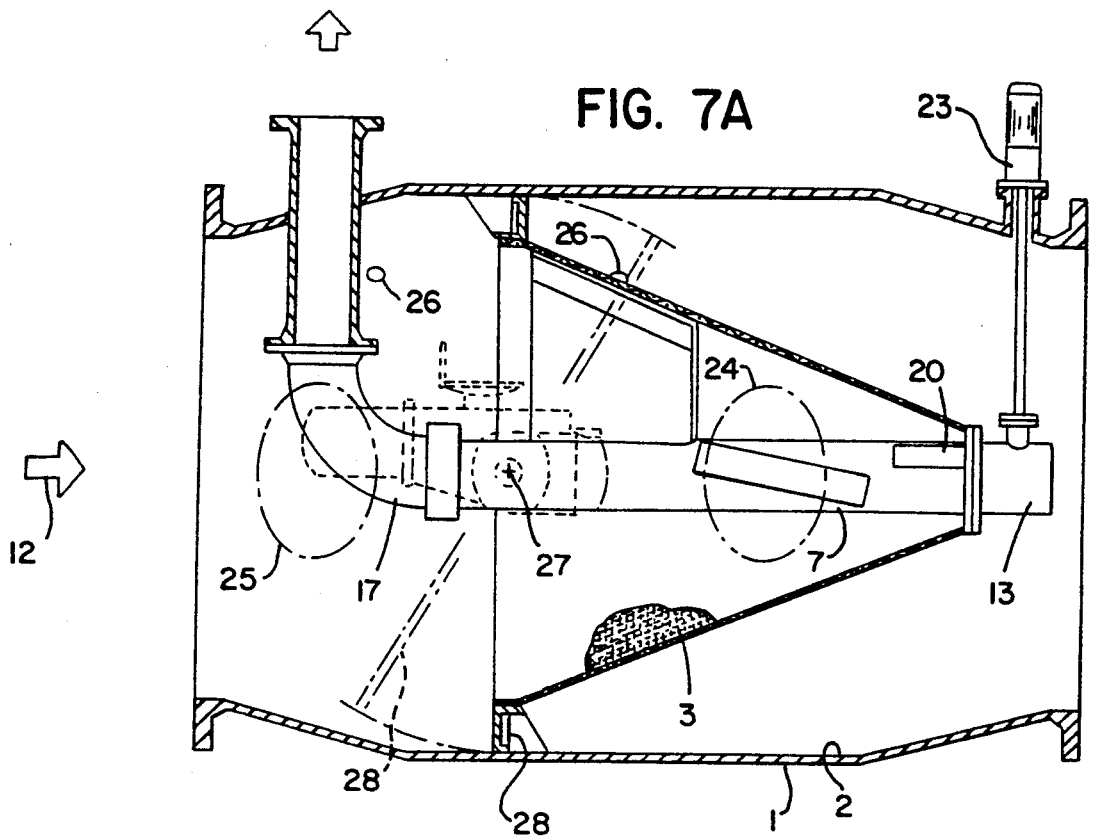
Figure 7B:
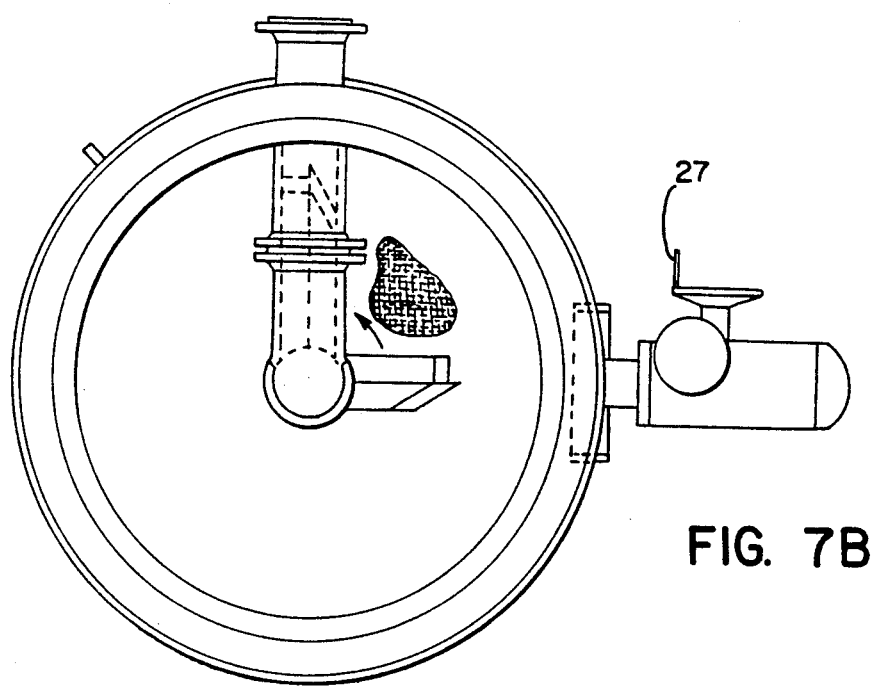
Figure 8A:
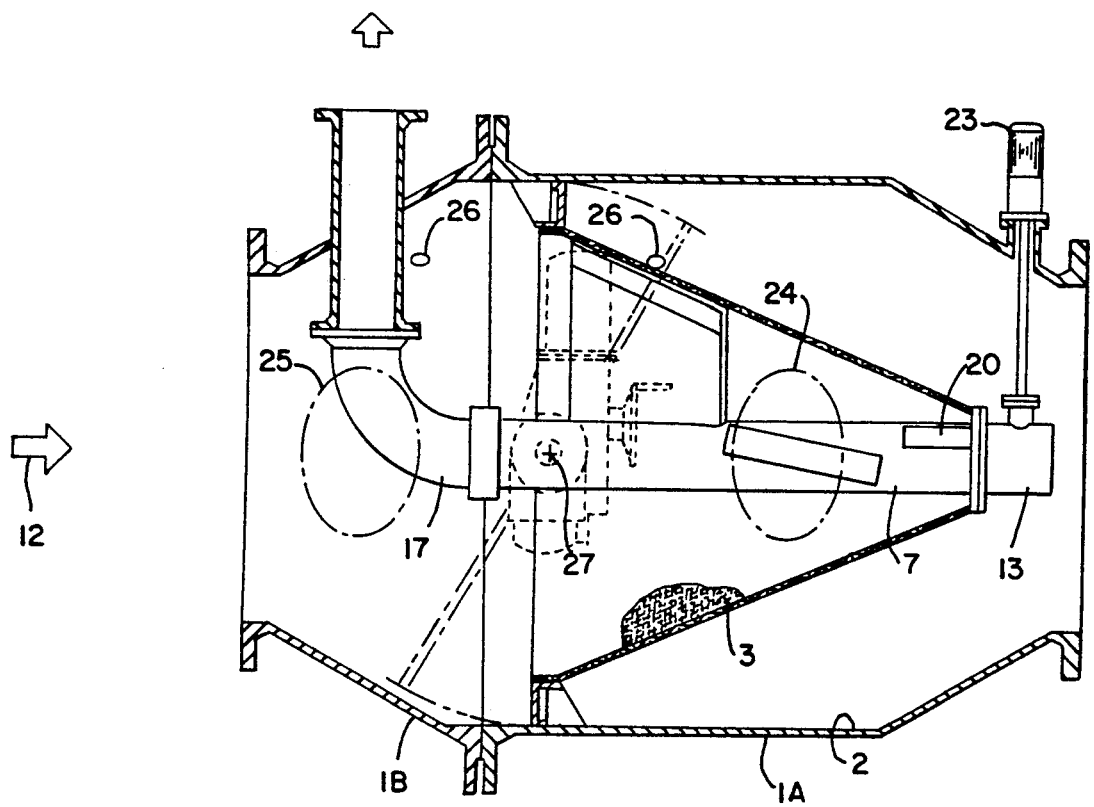
Figure 8B:
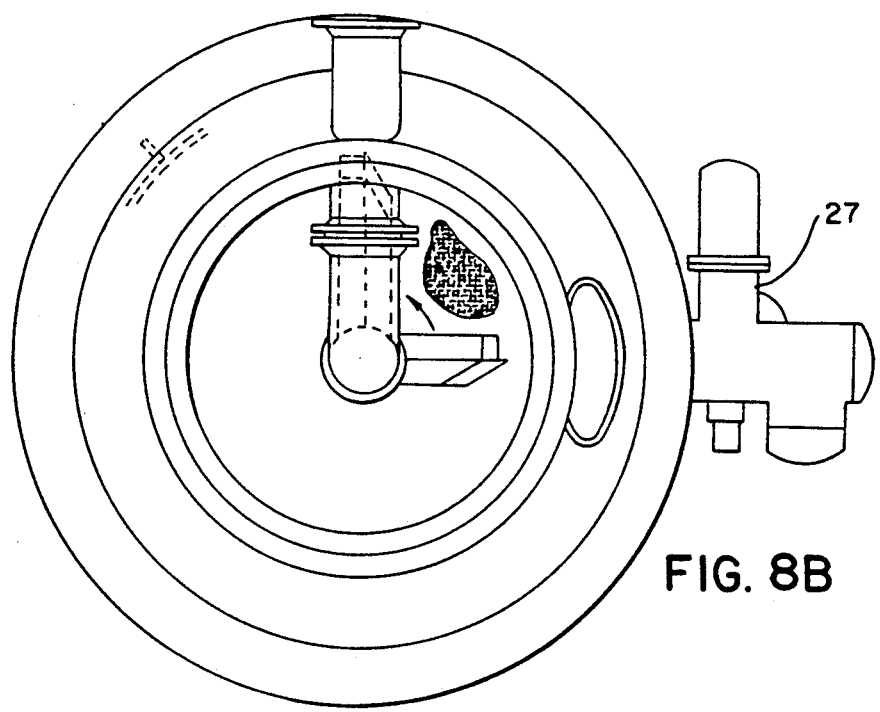

With respect to FIGS. 7A and 7B, there is to be seen a safety overpressure means 28 (having similar use than the means 10, 10' in FIG. 3), but in case of this embodiment a ring is used, sealing the rim of the screen 3 from the inner surface 2 of the housing 2. The ring has the form of a flap being rotatable around axis 27 to open a ringlike opening in case of overpressure (if the screen is for example completely filled with debris). Again, there is a further embodiment where the housing comprises two parts 1A and 1B (see FIGS. 8A and 8B) for applications where the tubes leading the fluid to be screened are of much smaller diameter than is practical for the housing enclosing the screen device according to the invention.

Various modes of carrying out the present invention are contemplated as being within the scope of the following claims particularly pointing out and distinctly claiming the subject matter which is regarded as the invention.

I claim:

1. In a device for the separation of solid materials from liquid flowing in a pipe, including a pipe shaped housing (1) having an interior wall (2) and defining an axis, the interior wall (2) of said housing enclosing a coaxially arranged rotationally symmetric filter (3) having a tapered filter surface which surface converges in the direction of the flow, the improvement comprising a suction device (4) having an elongate suction head defining a first suction opening positioned on the upstream side of the filter, said suction device and said filter being rotatably mounted relative to each other, said suction head positioned at an angle to a surface generation line (6) of the filter surface (3), and an axially mounted suction tube (7) which ends, in the direction of flow, near the filter surface convergence and includes at said end a second suction opening (8) larger than the first suction opening for coarse grained contaminants that are retained near said filter surface convergence, and means for rotating either the suction device (4) with the suction rotor (7) or the filter (3).

2. The device according to claim 1 wherein the fact that the suction device (4) is in the form of a spiral.

3. The device according to claim 1 wherein the suction device (4) is subdivided into several sections (5), the sections (5) being positioned on the screen circumference to sweep the entire filter surface (3) with each revolution of either the suction device or the filter.

4. The device according to claim 1 wherein the suction device (4) includes elastic sealing lips (9).

5. The device according to claim 1 wherein the filter (3) is funnel-shaped and the downstream end of the filter is axially extendably mounted in the direction of flow as a bypass flap (10).

6. The device according to claim 5 wherein the bypass flap (10) is of a truncated shape with respect to the filter surface.

7. The device according to claim 6 wherein the surface of the bypass flap comprises a filter.

8. The device according to claim 6 wherein the surface of the bypass flap is closed.

9. The device according to claim 1 wherein a turbulence plate (15) is affixed to the suction device (4) parallel to the filter surface (16).

* * * * *